(12) United States Patent
Zhou et al.

(10) Patent No.: US 8,299,406 B2
(45) Date of Patent: Oct. 30, 2012

(54) ELECTRONIC TEMPERATURE-SENSING PROBE

(75) Inventors: Shaohui Zhou, Fujian (CN); I.V. Junxiao, Fujian (CN)

(73) Assignee: Tsann Kuen (China) Enterprise Co., Ltd., Xiamen, Fujian (CN)

( * ) Notice: Subject to any disclaimer, the term of this patent is extended or adjusted under 35 U.S.C. 154(b) by 472 days.

(21) Appl. No.: 12/110,608

(22) Filed: Apr. 28, 2008

(65) Prior Publication Data
US 2010/0276415 A1    Nov. 4, 2010

(30) Foreign Application Priority Data
Apr. 27, 2007 (CN) .......................... 2007 1 0008926

(51) Int. Cl.
*H05B 1/02* (2006.01)

(52) U.S. Cl. ........ 219/494; 219/497; 219/506; 219/502; 219/446.1; 219/448.12

(58) Field of Classification Search .................. 219/494, 219/497, 501, 506, 441, 443.1, 446.1, 448.11
See application file for complete search history.

(56) References Cited

U.S. PATENT DOCUMENTS

| 3,990,623 | A  | * | 11/1976 | Fortune .......................... 228/57 |
| 6,388,236 | B1 | * | 5/2002  | Chang ........................... 219/435 |
| 7,403,805 | B2 | * | 7/2008  | Abreu ........................... 600/318 |
| 2006/0254432 | A1 | * | 11/2006 | McLemore ..................... 99/448 |

* cited by examiner

*Primary Examiner* — Mark Paschall
(74) *Attorney, Agent, or Firm* — Kening Li; Pinsent Masons LLP

(57) ABSTRACT

An electronic temperature-sensing probe comprises a shell, a control base plate, a probe and a key group, wherein the control base plate is placed inside the shell; the probe with one end extending outside of the shell and the other end connected to the control base plate electrically is mounted in the shell; the key group with their inner ends connected to control contacts of the control base plate are depressibly mounted on the surface of the shell; the key group comprises a power switch key, temperature-adjusting keys and a high temperature switch key; the control base plate controls the power on/off of the heating element based on the temperature control signals provided by the temperature-adjusting keys and the high temperature switch key and the temperature signal provided by the probe and the switch control signal provided by the power switch key.

9 Claims, 3 Drawing Sheets

ELECTRONIC TEMPERATURE-SENSING PROBE

FIELD OF THE INVENTION

The present invention relates to a cooking device, more particularly to an electronic temperature-sensing probe for an electrical cooking device.

RELATED ART

Many electronic cooking devices have a plug-in electronic temperature-sensing probe for detecting and adjusting the temperature of the electronic cooking devices. Known electronic temperature-sensing probe usually can adjust the temperature of the cooking device by stages, so users can choose needed stage by rotating knobs of the electronic temperature-sensing probe.

But some cooking devices and some food have especial needs of temperature controlling. For instance, when the cooking device is used to cook beefsteak, the slap-up beefsteak usually should have a slightly burnt surface and a tepid interior with abundant meat juice. Therefore in cooking beefsteak, firstly the cooking pan is heated rapidly to a high temperature to make the beefsteak have a slightly burnt surface wrapping meat juice in it to avoid vaporizing, then cooking the beefsteak in low temperature slowly to make the beefsteak be fully cooked.

Although above-mentioned temperature-sensing probe can adjust temperature between high temperature and low temperature to carry out above cooking modes, but it is inconvenient for users. Users do not know what a high temperature is and how long the high temperature should be kept, and users may be probably to forget to adjust the temperature-adjusting knob to the low temperature after adjusting the temperature-adjusting knob to the high temperature so that the beefsteak is easily burnt.

SUMMARY OF THE INVENTION

The present invention provides an electronic temperature-sensing probe, whose primary object is to overcome the disadvantageous of inconvenient using of known electronic temperature-sensing probe of electrical heating cooking device in controlling the cooking of some especial food having especial require of temperature controlling.

Such object of the present invention will become apparent in the ensuing description:

An electronic temperature-sensing probe, comprising a shell, a control base plate, a probe and a key group, wherein the control base plate is placed in the shell; the probe with one end extending outside of the shell and the other end connected to the control base plate electrically is mounted in the shell; the key group with their inner ends connected to control contacts of the control base plate are depressibly/rotatably mounted on the surface of the shell; the keygroup comprises temperature-adjusting keys and a high temperature switch key; the control base plate controls the power on/off of the heating element based on the temperature control signals provided by the temperature-adjusting keys and the high temperature switch key and the temperature signal provided by the probe.

Wherein the temperature controlled by the temperature control signal provided by the high temperature switch key varies from 245° C. to 275° C., preferably 260° C., and the heating time controlled by the temperature control signal provided by the high temperature switch key is 2 minutes.

The control base plate comprises a power module, a control module of the heating element, a temperature collection module, a key input module and a process control module; the power module is used to be connected to an external AC power to supply a DC power for the whole control base plate; the control module of the heating element is controlled by the process control module and controls the power on/off of the heating element; the temperature collection module connects the probe with the process control module and provides temperature signal for the process control module; the key input module connects the key group with the process control module and transforms the action of the key group into control signals, and transmits the control signals to the process control module; the process control module controls above all modules coordinately.

The temperature-adjusting keys provide six-stage temperature control signals at 100° C., 150° C., 170° C., 190° C., 210° C. and 230° C. that are respectively corresponding with six LED lamps which are connected to and controlled by the control base plate.

Accordingly, the control base plate comprises a power module, a control module of the heating element, a temperature collection module, a LED lamp control module, a key input module and a process control module; the power module is used to be connected to an external AC power to supply a DC power for the whole control base plate; the control module of the heating element is controlled by the process control module and controls the power on/off of the heating element; the temperature collection module connects the probe with the process control module and provides temperature signal for the process control module; the LED lamps are controlled by the process control module which can control the power on/off of the LED lamps; the key input module connects the key group with the process control module and transforms the action of the key group into control signals, and transmits the control signals to the process control module; the process control module controls above all modules coordinately.

As shown in above-mentioned descriptions compared with the existing technology, the present invention has advantages as follows: the present invention has special design according to cooking mode of especial food. When the electronic heating cooking device adopting the present invention cooking some especial food having especial require of temperature controlling, users operate the electronic heating cooking device conveniently and safely. Take cooking meat by cooking device for instance, firstly press the high temperature switch key to make the temperature of the cooking pan to a set temperature, and then put meat into it; when the surface of meat is slightly burnt, the temperature reverts to a low state automatically, and then adjust the temperature of the cooking pan by temperature-adjusting key to cool the meat slowly to make the meat be fully cooked and have abundant meat juice in its interior.

DETAILED DESCRIPTION OF THE PREFERRED EMBODIMENTS

Figure 1:
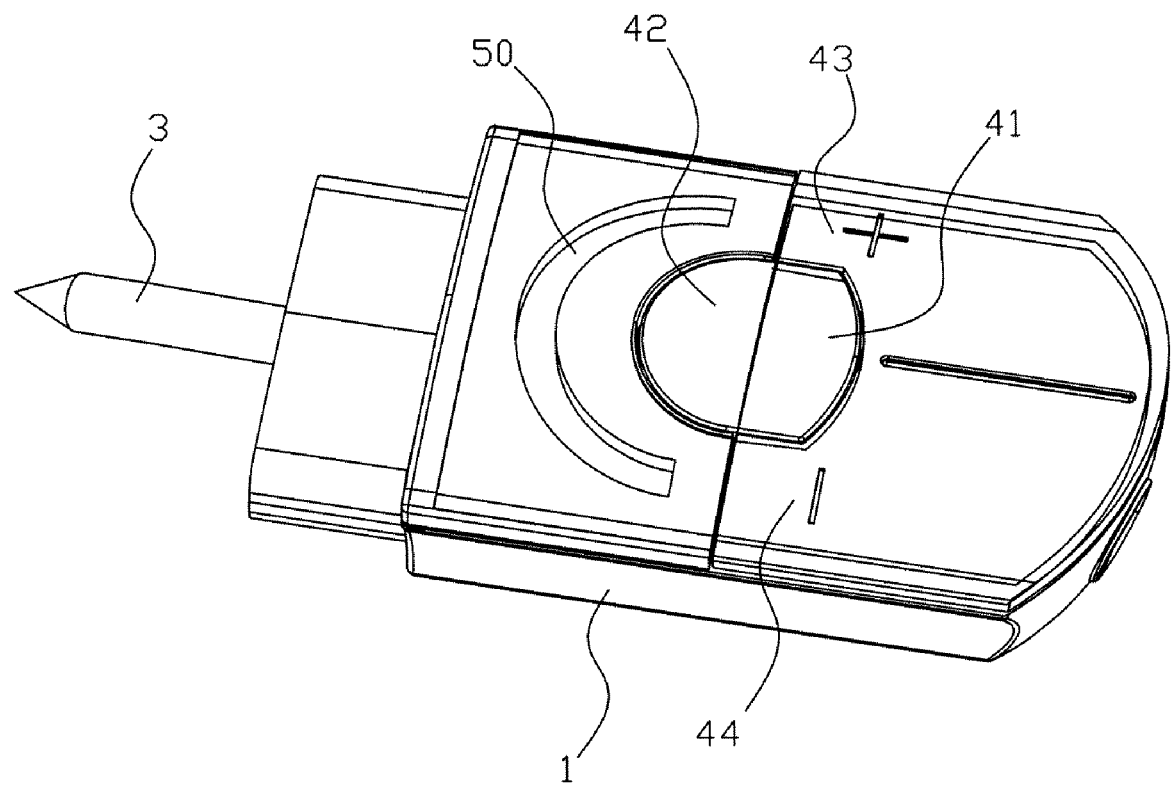
FIG. 1 is a perspective view of the present invention.
Figure 2:
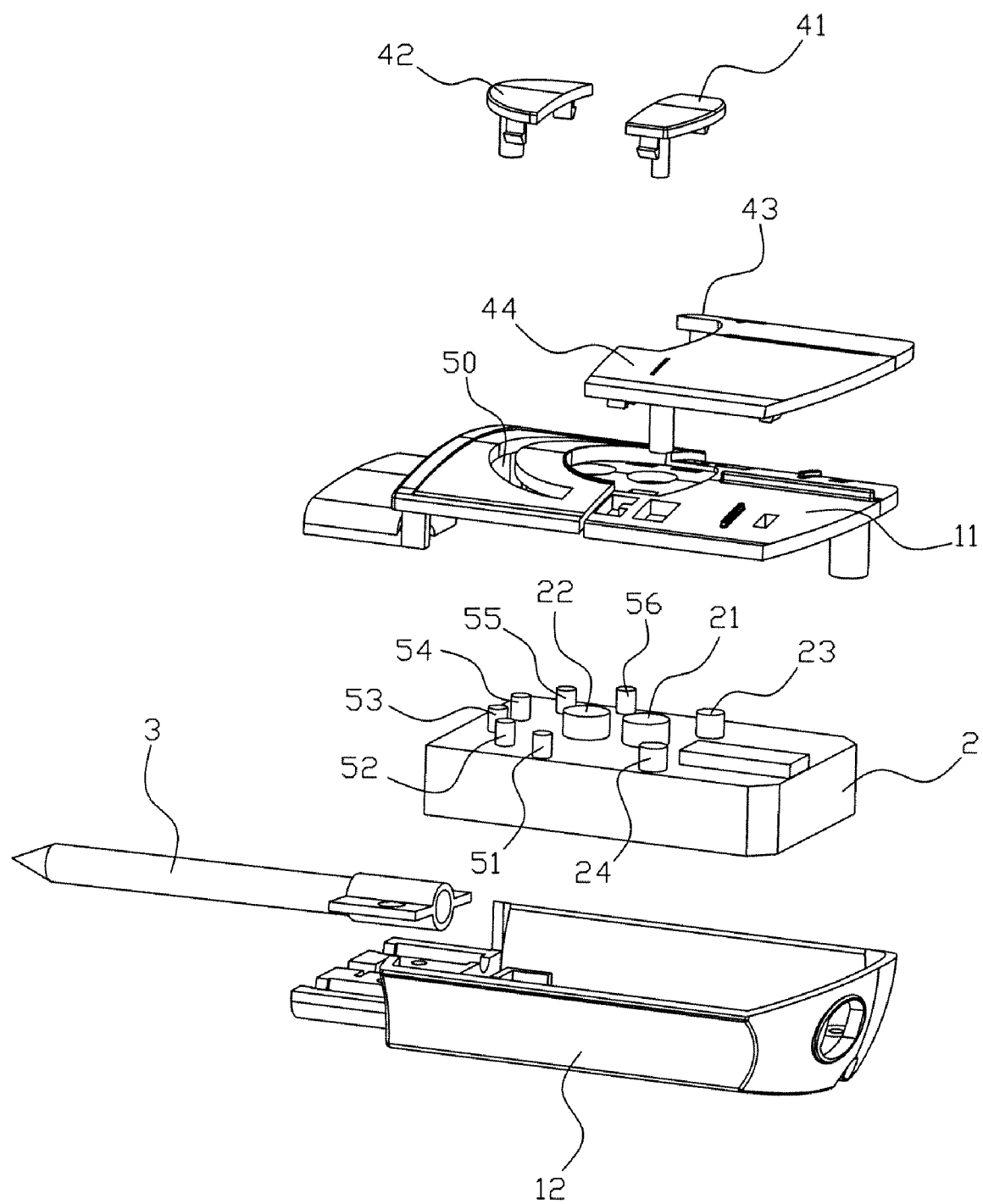
FIG. 2 is an exploded view of the present invention.
Figure 3:
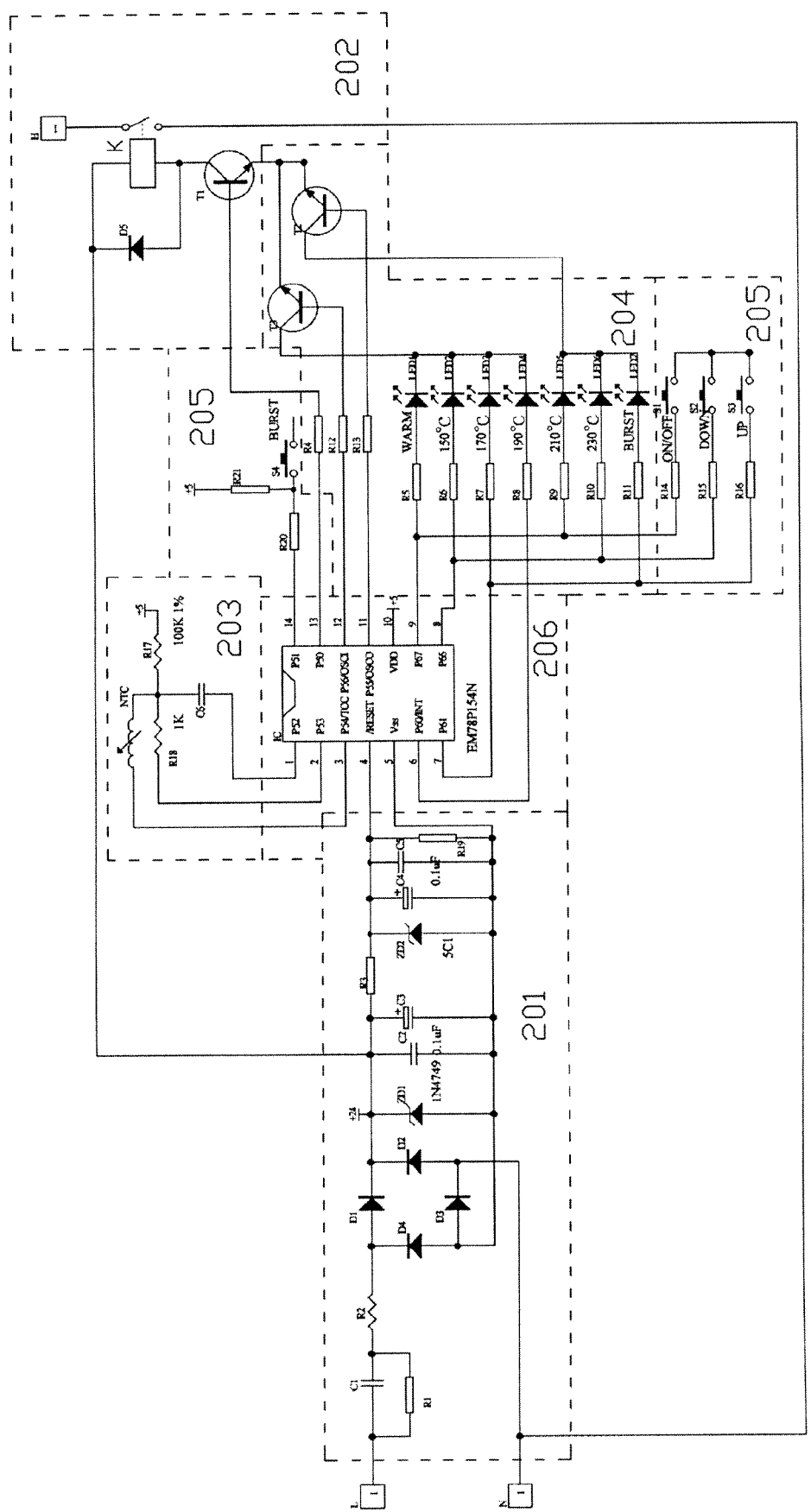
FIG. 3 is a logic diagram of the present invention.

An electronic temperature-sensing probe according to a preferred embodiment of the present invention is shown in FIGS. 1 to 3.

Referring to FIGS. 1 and 2, the electronic temperature-sensing probe comprises a shell 1, a control base plate 2, a probe 3 and a key group. The shell 1 consists of an upper shell 11 and a lower shell 12 which can be mutually fastened to each other, and the control base plate 2 is disposed inside the shell 1; the probe 3 with one end extending outside of the shell 1 and the other end connected to the control base plate 2 electrically is mounted in the shell 1. The key group with their inner ends connected to control contacts of the control base plate 2 are depressibly mounted on the surface of the shell 1. The control base plate 2 is connected to the electrical heating element of the electrical heating cooking device.

The key group comprises a power switch key 41, two temperature-adjusting keys 43,44 and a high temperature switch key 42; the high temperature switch key 42 and the power switch key 41 are disposed on the middle part of the upper surface of the shell 1 orderly, and the temperature-adjusting keys 43,44 are arranged behind the power switch key 41, and an arcuate orifice 50 is arranged beside the high temperature switch key 42. The control base plate 2 has control contacts 21,23,24,22 that are respectively connected to the power switch key 41 and the temperature-adjusting keys 43,44 and the high temperature switch key 42, and six circular LED lamps 51,52,53,54,55,56 that are arranged to match with the arcuate orifice 50.

The control base plate 2 controls the power on/off of a heating element of the electrical heating cooking device based on temperature control signals provided by the temperature-adjusting keys 43,44 and the high temperature switch key 42, the switch control signal provided by the power switch key 41 and the temperature signal provided by the probe 3.

The range of the temperature controlled by the temperature control signal provided by the high temperature switch key 42 varies from 245° C. to 275° C., preferably 260° C., and the heating time is 2 minutes. The temperature-adjusting keys 43,44 adjust temperature by degrees and provide six-stage temperature control signals at 100° C., 150° C., 170° C., 190° C., 210° C., and 230° C. that are corresponding with the six circular LED lamps 51,52,53,54,55,56 respectively.

Referring to FIG. 3, the circuit of the control base plate 2 comprises a power module 201, a control module 202 of the heating element, a temperature collection module 203, a control module 204 of LED lamps, a key input module 205 and a process control module 206.

The power module 201 is used to be connected to an external AC power and commutates the external AC to DC to supply a DC power for the whole control base plate 2. The control module 202 of the heating element is controlled by the process control module 206, and control the power on/off of the relay K by the audion T1, then control the power on/off of the heating element of the electrical heating cooking device via the contact of the relay K. The temperature collection module 203 connects the probe 3 and the process control module 206, and mainly comprises thermal resistor NTC, resistance E18 and capacitance C6, and provides temperature signal that is actually resistance value of the thermal resistor NTC for the process control module 206; the process control module 206 identifies the change of the temperature through the change of the thermal resistor NTC. The control module 204 of LED lamps is controlled by the process control module 206, and control the power on/off of the six LED lamps 51,52,53,54,55,56 by audions T2 and T3. The key input module 205 connects the key group with the process control module 206, and transforms the action of the power switch key 41, the temperature-adjusting keys 43,44 and the high temperature switch key 42 into control signal, and transmits the control signal to the process control module 206. The process control module 206 mainly comprises a control chip, and controls all above modules via control program coordinately.

The process control module 206 gets a temperature signal via the temperature collection module 203, then controls the heating of the electrical heating element of the electrical heating cooking device by the control chip, wherein detailed process is as follows (herein supposing user choosing 190° C. stage by the temperature-adjusting keys 43,44).

First, the electrical heating element heats from room temperature according to the signal provided by the control chip.

Second, when the temperature of the thermal resistor NTC approaches 185° C., the heating mode of the electrical heating element is changed to the mode of power on/off by 4 seconds interval to avoid the remaining heat of the electrical heating element heating to make the thermal resistor NTC exceeding 190° C. if the thermal resistor NTC reached 190° C.

Third, when the temperature of the thermal resistor NTC gets to 190° C., the electrical heating element stops heating according to the signal provided by the control chip.

Fourth, keep the temperature of the thermal resistor NTC between 188° C. and 192° C. by the mode as follows: when the temperature gets below 188° C., the electrical heating element heats by the mode of power on/off by 4 seconds interval until 190° C., then the electrical heating element stops heating until the temperature of the thermal resistor NTC gets below 188° C., then it starts another circle.

Fifth, when users cooking food in the process of heat preservation, the temperature of the thermal resistor NTC falls by a large margin, the electrical heating element heats to 190° C. quickly according to the signal provided by the control chip.

When the control base plate 2 is connected to the electrical source, all the LED lamps and the relay K do not work. When the power switch key 41 is pressed, the LED lamp 51 and the relay K works. When the temperature-adjusting key 43 is pressed time after time, the LED lamps 52,53,54,55,56 light up orderly. When the LED lamp 56 lights up, to press the temperature-adjusting key 43 will not work. Contrarily, when the temperature-adjusting key 44 is pressed time after time, the LED lamps 52,53,54,55,56 go out orderly until all LED lamps go out. Referring to FIG. 3, when the high temperature switch key 42 is pressed, the LED lamp 7 lights up, the electrical heating element heats to make the thermal resistor NTC gets to 260° C., then keeps heating for 2 minutes until the LED lamp 7 goes out, here the thermal resistor NTC reverts to the state that the high temperature switch key 42 was not pressed.

When the temperature-adjusting keys 43,44 have been set over 2 seconds, the relay K works to make the electrical heating element of the electrical heating cooking device begin to heat. Here the LED lamp corresponding with the set temperature shines intermittently while the temperature is below the set temperature. When the temperature gets to the set value, the LED lamp shines all along.

In the present embodiment, all keys are buttons. Alternatively, the above-mentioned keys can also be changed to knobs easily.

The foregoing description of the exemplary embodiment of the invention has been presented for the purposes of illustration and description. It is not intended to be exhaustive or to limit the invention to the precise form disclosed. Many modifications and variations are possible in light of the above teaching. All changes that come within the meaning and range of equivalency of the claims are to be embraced within their scope.

What is claimed is:

1. An electronic temperature-sensing probe, comprising: a shell, a control base plate, a probe and a key group, wherein said control base plate is placed inside said shell; said probe with one end extending outside of said shell and the other end connected to said control base plate electrically is mounted in said shell; said key group with their inner ends connected to control contacts of said control base plate is mounted on a surface of said shell; said key group comprises a power switch key, temperature-adjusting keys and a high temperature switch key; said control base plate controls a power on/off of a heating element based on temperature control signals provided by said temperature-adjusting keys and said high temperature switch key, a power on/off signal provided by said power switch key and a temperature signal provided by said probe;

wherein the temperature controlled by said temperature control signal provided by said high temperature switch key ranges from 245° C. to 275° C.;

wherein the electrical heating element keeps heating for a duration when the high temperature switch key is pressed and the temperature controlled by said temperature control signal provided by said high temperature switch key automatically returns after the duration to the state before the high temperature switch key is pressed;

wherein the electrical heating element is changed to the mode of power on/off by an interval when the temperature reaches a predetermined temperature.

2. The electronic temperature-sensing probe according to claim 1, wherein the temperature controlled by said temperature control signal provided by said high temperature switch key is 260° C.

3. The electronic temperature-sensing probe according to claims 1, wherein said control base plate comprises a power module, a control module of said heating element, a temperature collection module, a key input module and a process control module; said power module is used to be connected to an external AC power to supply a DC power for the whole said control base plate; said control module of said heating element is controlled by said process control module and controls the power on/off of said heating element; said temperature collection module connects said probe with said process control module and provides a temperature signal for said process control module; said key input module connects said key group with said process control module and transforms the action of said key group into control signals, and transmits said control signals to said process control module; said process control module controls above all said modules coordinately.

4. The electronic temperature-sensing probe according to claim 1, wherein said temperature-adjusting keys provide six-stage temperature control signals at 100° C., 150° C., 170° C., 190° C., 210° C. and 230° C. that are respectively corresponding with six LED lamps which are connected to and controlled by said control base plate.

5. The electronic temperature-sensing probe according to claim 4, wherein said control base plate comprises a power module, a control module of said heating element, a temperature collection module, a LED lamp control module, a key input module and a process control module; said power module is used to be connected to an external AC power to supply a DC power for the whole said control base plate; said control module of said heating element is controlled by said process control module and controls the power on/off of said heating element; said temperature collection module connects said probe with said process control module and provides temperature signal for said process control module; said LED lamp control module is controlled by said process control module and controls the power on/off of said LED lamp; said key input module connects said key group with said process control module and transforms the action of said key group into control signals, and transmits said control signals to said process control module; said process control module controls above all said modules coordinately.

6. The electronic temperature-sensing probe according to claim 1, wherein said key group with their inner ends connected to control contacts of said control base plate are depressibly/rotatably mounted on a surface of said shell.

7. The electronic temperature-sensing probe according to claim 1, wherein said key group is selected from the group consist of a button and a knob.

8. The electronic temperature-sensing probe according to claim 1, wherein the duration is 2 minutes.

9. The electronic temperature-sensing probe according to claim 1, wherein the interval is 4 seconds.

* * * * *